Aug. 10, 1943.   W. H. HASLAM   2,326,356
VEGETABLE WASHING MACHINE
Filed Oct. 16, 1941

INVENTOR
William Heywood Haslam
BY
Thos. E. Scofield
ATTORNEY

Patented Aug. 10, 1943

2,326,356

UNITED STATES PATENT OFFICE 2,326,356

VEGETABLE WASHING MACHINE

William Heywood Haslam, London, England, assignor to Fisadco Limited, London, England, a British company Application October 16, 1941, Serial No. 415,201
In Great Britain October 26, 1940

2 Claims. (Cl. 146—201)

This invention relates to machines for washing vegetables, such as potatoes and carrots, or like products, such as fruit, which require cleaning before use. The term "Washing" includes scouring in the sense that part of the surface skin may be removed in the operation, as well as any adhering dirt.

The principal object of the invention is to provide a machine in which such vegetables as potatoes may be washed efficiently without removing the skin to any greater extent than is required.

Another object of the invention is to provide means for brushing vegetables or the like while simultaneously spraying them with water and causing them to roll over one another and by their contact with one another to remove adherent dirt.

Yet another object of the invention is to provide a machine in which the vegetables or the like are alternately brought into contact with brushing surfaces and abrasive surfaces while being sprayed with water.

A still further object of the invention is to provide a machine in which a batch of vegetables or the like to be washed may be placed and left unattended throughout the whole washing operation.

Broadly speaking, the essential features of the machine of the invention are a stationary drum, a rotary bottom plate, means for spraying water onto the vegetables while they are in the drum and carried around by the bottom plate, and means for brushing the surfaces of the vegetables while they are so carried around. An important feature of the invention is the provision of a central rotary brush. This may rotate in the opposite direction to the rotary bottom plate, and here should be enough clearance between the brush and the plate for this purpose. However, the brush may rotate in the same direction as the plate. The brush is preferably made reel-shaped or waisted, as it is found that the movement of the vegetables over one another is promoted by this.

It is found advantageous also to provide abrasive surfaces in the drum, and these may take the form either of rough metal surfaces or of a material such as carborundum. The former are preferred, as they can readily be made detachable for replacement purposes.

Figure 1:
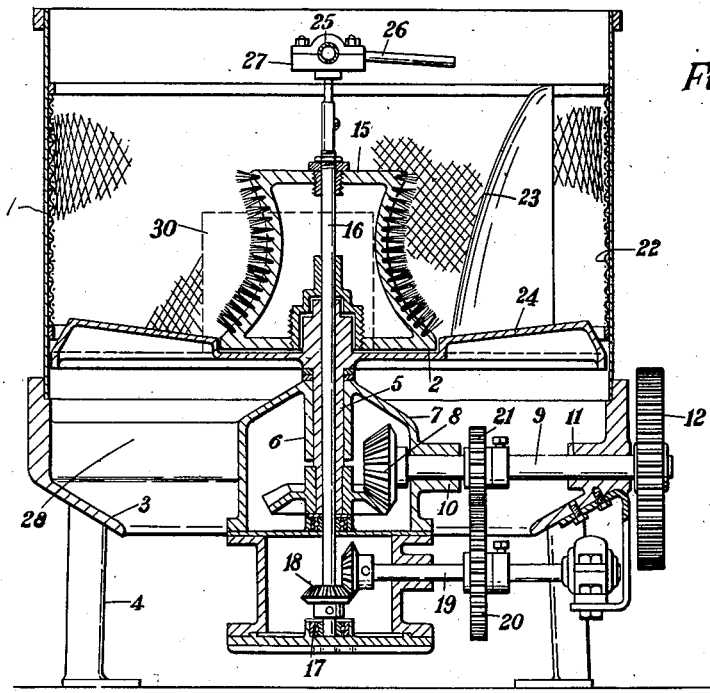
Figure 2:
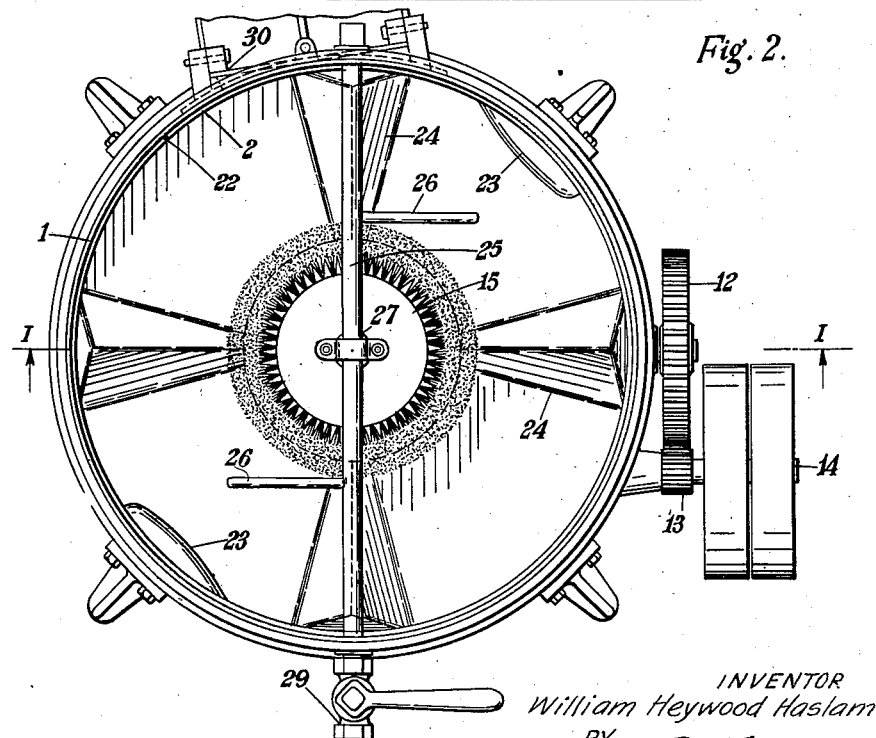

The preferred embodiment of the invention will now be described by way of example with reference to the accompanying drawing, in which:

Figure 1 is a central vertical section through the machine on the line I—I in Figure 2, which is a plan.

The machine comprises a stationary drum 1 having a rotary bottom plate 2. A pipe 25 furnished with spraying branches 26 extends across the top of the drum and is connected to a water pipe line through a union 29. The outer edge of the plate 2 is spaced slightly away from the wall of the drum 1 so that water sprayed on vegetables placed in the drum can run away between the plate 2 and the drum. The drum is carried on a stand comprising a chute part 3, into which the water runs, and legs 4. The rotary plate 2 has a central downwardly projecting boss 5 which is mounted to rotate in a vertical sleeve 6 integral with a gear casing 7. This casing is carried by a spider secured to the chute part 3, one of the arms of the spider being shown at 28. The boss, and therefore the rotary plate, are driven through bevel gears 8 by a shaft 9 which is carried in two bearings, one of these 10 being formed on the casing 7 and the other 11 being made integral with the part 3 of the stand. The shaft 9 also carries a gear wheel 12 which meshes with another gear wheel 13 on a pulley shaft 14.

A waisted brush 15 is mounted to rotate in the centre of the drum 1. It is carried by a spindle 16 which passes through the boss 5 and which is supported at its upper end by a bearing 27 secured to the pipe 25 and by a bearing 17. The spindle 16 is driven through bevel gears 18 by a shaft 19, which in turn is driven by gears 20 and 21 from the shaft 9. The gearing is such that the brush 15 rotates in the opposite direction and at about twice the speed of the plate 2. The latter may advantageously rotate at a relatively slow speed, such for example as 45 R. P. M.

The inner wall of the drum 1 has an abrasive lining 22 made of metal gauze capable of easy removal for replacement, and deflecting members 23 project inwards from the lining. The radial plate 2 is formed with four radial ribs 24. As a result, when the plate is rotated and water is sprayed into the drum, vegetables, such as potatoes, placed in the drum are lifted by the ribs 24 and deflected inwards against the action of centrifugal force by deflecting members 23. While they are thus moving about inside the drum and rolling over one another they come into contact with the bristles of the brush and with the abrasive lining 22.

The drum is provided with a discharge door 30 through which the washed products can be rapidly ejected when the operation is finished while the bottom plate continues to rotate.

If desired, the lining may be made undulating around the whole circumference of the drum.

If it is essential to conserve the water, the whole machine may be mounted over a settling tank into which the washing water is discharged and from the top of which the water may be withdrawn again to be circulated by a rotary pump.

In experiments which I have made it has been found that potatoes, carrots and other root vegetables can be thoroughly cleaned in this machine in a washing operation lasting for only a short time, say up to ten minutes, and the washing is generally sufficient to enable the products to be cooked without any further peeling or treatment. In the case of potatoes for example the soil is cleared out from the eyes or depressions and the rough skin is removed so that the potatoes are ready to be cooked and eaten without peeling. The rolling of the products upon one another as the bottom plate rotates plays an important part in the cleaning operation, as it serves to remove the dirt without also removing material valuable as food. The machine therefore presents substantial advantages over existing machines in which potatoes are peeled by being carried around at a high speed in contact with an abrasive surface, as a result of which as much as 10% of their weight is often lost. Moreover, the washing is visible throughout the whole operation of the present machine, and once a batch of potatoes or other vegetables has been placed in the machine the operator can attend to other matters until the operation is finished.

I claim:

1. A vegetable washing device comprising in combination a stationary drum adapted to receive vegetables to be washed, a water spray therein, a rotatable plate in the bottom of the drum for supporting the vegetables, ridges on the plate sloping from high portions near the circumference to low portions near its center, a rotatable brush mounted on a vertical shaft centrally of the drum above said plate, means for rotating said plate and said brush whereby the vegetables will be tumbled inwardly against the rotating brush by the ridges and sprayed during the brushing operation.

2. A vegetable washing device comprising in combination a stationary drum adapted to receive vegetables to be washed, a water spray therein, a rotatable plate in the bottom of the drum for supporting the vegetables, ridges on the plate sloping from high portions near the circumference to low portions near the center, a rotatable brush mounted on a vertical shaft centrally of the drum above said plate, means for rotating said plate and said brush at differential speeds whereby the vegetables will be tumbled inwardly by the ridges against the rotating brush and sprayed during the brushing operation.

WILLIAM HEYWOOD HASLAM.